United States Patent Office 2,758,013
Patented Aug. 7, 1956

2,758,013

PROCESS OF MANUFACTURING A COPPER COMPOUND CONTAINING COPPER HYDROXIDE

Eiji Munekata, Tokyo, Japan, assignor to Asahi Kasei Kogyo Kabushiki Kaisha, Osaka, Japan, a corporation of Japan No Drawing. Application August 18, 1952, Serial No. 305,065

Claims priority, application Japan August 2, 1952

2 Claims. (Cl. 23—147)

This invention relates to a process for manufacturing a mixture of copper compounds containing copper hydroxide for the most part, and to the use thereof for preparing a cuprammonium solution of rayon.

If, any other radicals than hydroxyl radical, such as sulfate radicals are contained in the cuprammonium solution, they will lower the cellulose concentration of the cuprammonium solution. Not only is the quality of the regenerated rayon inferior, but also more copper will be required to dissolve the same amount of cellulose in a solution containing radicals such as sulfate. They will also deposit copper, from the cellulose solution, in the water coagulating bath and, thereby causing difficulties in the spinning operation.

An object of the invention is to manufacture a mixture of precipitated copper compounds the main part of which is copper hydroxide.

Another object of the invention is to manufacture a mixture of copper compounds containing a high percentage of copper hydroxide particularly useful for preparing a cuprammonium solution for rayon.

Another object of the invention is to improve the efficiency of cuprammonium rayon formation by using said copper compound, that is to say, by dissolving cellulose in the cuprammonium solution composed of said copper compounds and ammonia, to obtain a solution with a comparatively high concentration of cellulose, whereby the amount of copper used is comparatively small, and the cuprammonium rayon thus regenerated from this cuprammonium spinning solution possesses superior quality.

Another object of the invention is to obtain ammonium sulphate as a by-product.

The usual practice heretofore to preclude as far as possible the precipitation of copper in the coagulating bath was to add tartrate beforehand to the spinning solution or to add the tartrate or saccharides and saccharic acids. The present study reveals that the problems involved herein can be solved using a compound consisting essentially of copper and a hydroxyl radical. The defects caused by the sulphate radical in the copper compound used, for manufacturing the cuprammonium spinning solution are obviated. (Munekata: Bunri (Separation), Maruzen Co., Tokyo, 1951). As a result, the use of such preventive agents against deposit as tartrate and others becomes unnecessary. Furthermore, if no negative radical or radicals other than the hydroxyl exist in the cuprammonium cellulose solution, copper in the solution will effectively react solely to the dissolution of cellulose. Therefore, the amount of ineffective copper is small, and the amount of copper required for preparing the cuprammonium spinning solution can be decreased by 10-20 per cent.

As is seen from the foregoing explanation, the superiority of manufacturing the cuprammonium spinning solution by using the mixture of copper compound with no or but a few radicals other than hydroxyl radical, namely, pure copper hydroxide or a mixture of copper compound containing a high percentage of copper hydroxide, was appreciated, but how such a mixture of copper compound containing copper in precipitated state can be obtained has long been a subject for research. This invention has been developed, with such objective in view, centering on the efforts to find a process for preparing copper hydroxide of suitable properties for use in rayon manufacture.

Copper hydroxide, which in its commercial form does not have a correct representation from the chemical viewpoint, is prepared by reacting an aqueous solution of copper sulfate with sodium carbonate or ammonia. The adjustment of the pH of the solution in which the chemical reaction takes place is of great importance. In the conventional process the reaction is shown in the following equation:

$$4CuSO_4 + 3NaCO_3 + 3H_2O \rightarrow CuSO_4 \cdot 3Cu(OH)_2 + 3Na_2SO_4 + 3CO_2$$

The said reaction takes place at a temperature close to the boiling point in an acidic state, at a pH which is less than 7; only 75% of copper contained in the copper precipitate thus obtained exists in a form of copper hydroxide. However, in the present invention, the pH is kept between 7 and 8, and the reaction takes place unexpectedly at ordinary temperature or below. The reaction is shown in the following equation:

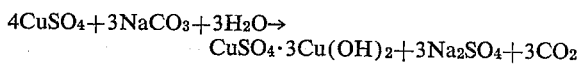
$$10CuSO_4 + 18NH_4OH \rightarrow CuSO_4 \cdot 3Cu(OH)_2 + 6Cu(OH)_2 + 9(NH_4)_2SO_4$$

at a pH close to 9, a similar reaction will take place as shown in the equation:

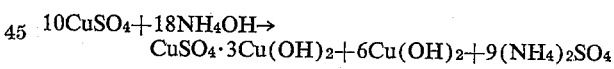
$$16CuSO_4 + 30NH_4OH \rightarrow CuSO_4 \cdot 3Cu(OH)_2 + 12Cu(OH)_2 + 15(NH_4)_2SO_4$$

However, the precise mechanism of the reaction is not yet clear.

The state of combined copper in the mixture of copper compounds thus obtained is mostly in the form of copper hydroxide: from the above chemical equation, copper hydroxide is about 90 to 94 per cent of the product.

Since the mixture of copper compounds thus obtained is a mixture of copper hydroxide Cu(OH)$_2$ and basic copper sulfate CuSO$_4\cdot$3Cu(OH)$_2$ and contains far less sulfate radical than the basic copper sulfate which has been used, the property of cuprammonium spinning solution is much improved by the application of this copper compound mixture, which has many advantages in spinning.

On the other hand, sodium sulfate, formed according to the conventional process by double decomposition and present in the cuprammonium cellulose solution, adversely affects the solution even if the copper sulfate in the basic copper sulfate is changed to the copper hydroxide by the reaction with caustic soda in cellulose solution.

Pure copper hydroxide is obtained by the reaction of basic copper sulfate and caustic soda in the course of cooling, $$CuSO_4\cdot 3Cu(OH)_2 + 2NaOH \rightarrow 4Cu(OH)_2 + Na_2SO_4$$

But in the manufacture of cuprammonium spinning solution, there is almost no difference in the function between such copper hydroxide and the mixture of copper hydroxide and basic copper sulfate prepared by this invention, for instance, CuSO$_4\cdot$3Cu(OH)$_2$+6Cu(OH)$_2$. Therefore, this material containing much copper hydroxide is used for manufacturing the cuprammonium spinning solution.

It is surprising that only efficient agitation is required for exact pH control, and that no extra heating is required while ammonium sulfate is being produced as a by-product from copper sulfate and ammonia, in order to recover the above mentioned precipitated raw material containing copper hydroxide. Accordingly, the precipitated raw material containing copper required for cuprammonium spinning solution containing much copper hydroxide, may be prepared in a process of manufacturing ammonium sulfate. However, when pH of the reaction system is kept at 8 or 9, about 10% to 20% of the copper in the precipitate dissolves in the coexisting mother liquor. Thereby the precipitate of the precipitated copper raw material containing copper hydroxide is separated from the mother liquor; sulfuric acid is added to the mother liquor to keep pH at 6 or less; the copper which is dissolved in the said mother liquor is then brought to precipitation as basic copper sulfate and then separated from the mother liquor which will contain less copper. Basic copper sulfate thus obtained is dissolved in sulphuric acid prepared separately, and is formed into a copper sulfate solution; it is then treated with ammonia, and used as part of the raw material for preparing precipitated copper raw material which contains much copper hydroxide. Whereas the mother liquor, which was separated and contains less copper, contains 5–10% of ammonium sulfate and more than 0.01% of copper, the copper therein is adsorbed and removed by an adsorbent, and is so treated that the copper content which still remains in the ammonium sulfate solution will be about 0.0002%. As to the adsorbent, both organic meterial, such as ion exchange resin or active carbon, and inorganic material are used. The adsorbent is packed in the adsorption vessel, and the mother liquor is passed therethrough. The copper thus adsorbed is dissolved in sulphuric acid, and recovered as aqueous solution of copper sulphate. Copper sulphate thus obtained is circulated as a raw material by adding ammonia.

The mother liquor of ammonium sulfate is boiled and concentrated, and the crystalline ammonium sulphate is manufactured. Above processes are illustrated as a whole in the following schematic table:

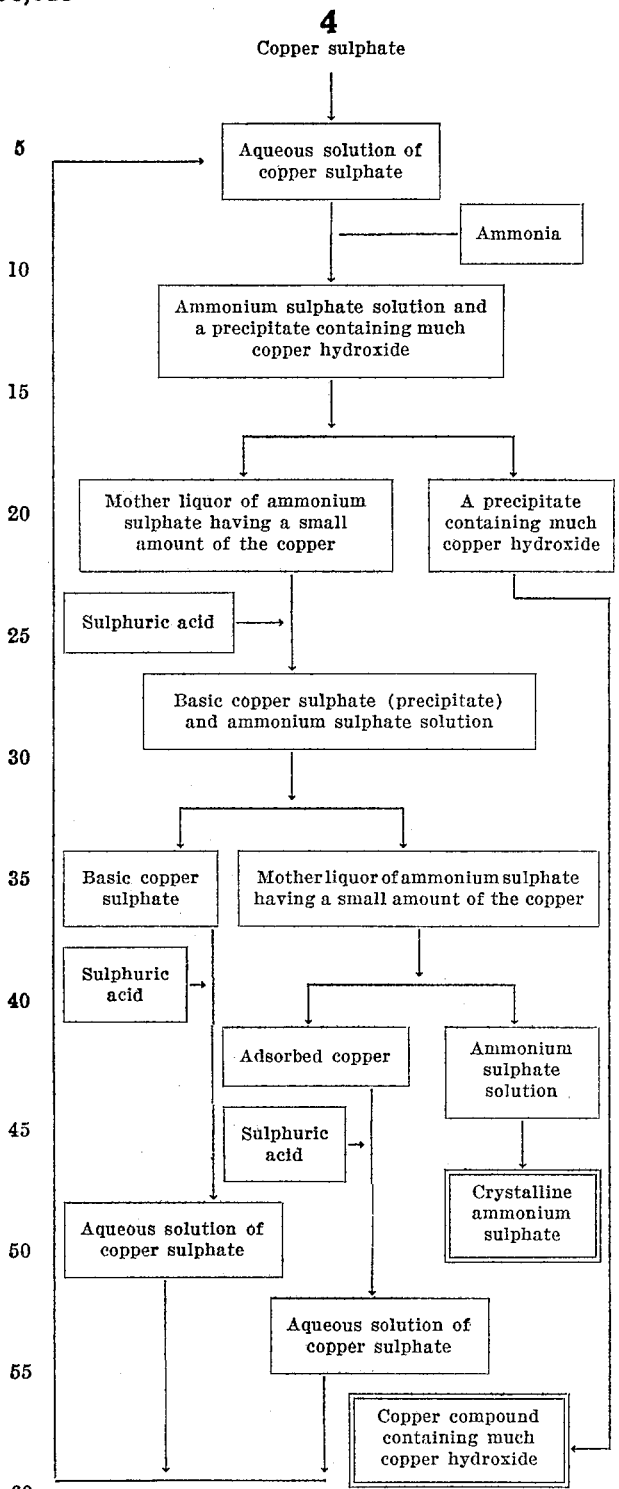

Thus, we can prepare a copper compound which is fitted for manufacturing cuprammonium cellulose solution suitable to prepare cuprammonium spinning solution from copper sulfate and ammonia; it is very advantageous, because ammonium sulfate is produced as a by-product simultaneously.

The copper compound which contains much copper hydroxide thus obtained is separated by filtration into a filtered cake, which is washed with water, whereby a suitable amount of water is added thereto, the copper content in the suspension is measured, and then this suspension is brought into a mixture firstly with ammonia for the purpose of manufacturing cuprammonium solution. Cellulose is added to the mixture to prepare finally the cuprammonium cellulose solution.

As the cuprammonium cellulose solution thus obtained contains chiefly a hydroxide radical beside copper, ammonia and cellulose and little of such a radical or radicals as sulfate, less difficulty is encountered in water coagulating bath treatment of the spinning process, even if such a chemical as tartrate is not added when the yarn is spun out of this cuprammonium spinning solution. It had been known for the inventor that the above stated effect could be achieved if pure coper hydroxide is used. However, it has been proven recently that almost the same result can be attained by using such a mixture of copper compounds containing much copper hydroxide as obtained by the process of the present invention. The use of such a mixture of copper compounds also proves that the amount of copper which is less approxim. 10 to 20% than the amount of copper hitherto required to dissolve cellulose is enough to bring out the same result. That is to say, in previous method the amount of copper required for the manufacturing of cuprammonium spinning solution was 40% or more by weight against the amount of cellulose when cotton linter is used as a cellulosic raw material. However, according to the invention, the amount of copper required as mentioned above was reduced by this invention under 40% while, as mentioned above, copper sulphate is circulated and there is little loss of copper. The curtailment of copper consumption has a noticeable significance from the economical view-point, because copper is expensive.

What I claim is:

1. A process for the manufacture of a precipitate composed of cupric hydroxide and a compound containing the sulfate radical, which process comprises the steps consisting essentially of (a) reacting at a final pH between 7 and 9 a first reactant consisting of cupric sulfate dissolved in water with a second reactant consisting of ammonia dissolved in water and containing an excess of ammonia, whereby said precipitate composed of cupric hydroxide and a compound containing the sulfate radical and also containing more than 80% of the total copper contained in the said aqueous cupric sulfate is directly obtained, said precipitate containing about 90 to 94% by weight of cupric hydroxide and being suitable for the preparation of a cuprammonium cellulose solution containing less than 40% by weight of copper relative to cellulose and being spinnable without the necessity of adding tartrate, and (b) separating the said precipitate from the mother liquor containing residual copper and by-produced ammonium sulfate.

2. A process for the manufacture of a precipitate composed of cupric hydroxide and a compound containing the sulfate radical, which process comprises the steps consisting essentially of (a) reacting at a final pH between 7 and 9 a first reactant consisting of cupric sulfate dissolved in water with a second reactant consisting of ammonia dissolved in water and containing an excess of ammonia, whereby said precipitate composed of cupric hydroxide and a compound containing the sulfate radical and also containing more than 80% of the total copper contained in the said aqueous cupric sulfate is directly obtained, said precipitate containing about 90 to 94% by weight of cupric hydroxide and being suitable for the preparation of a cuprammonium cellulose solution containing less than 40% by weight of copper relative to cellulose and being spinnable without the necessity of adding tartrate, and separating the said precipitate from the mother liquor containing residual copper and by-produced ammonium sulfate, (b) adding sulfuric acid to the said mother liquor after the separation of the precipitate therefrom, whereby soluble cupric compounds contained in the mother liquor are precipitated as basic cupric sulfate, and separating the latter from the residual mother liquor, (c) adding sulfuric acid to the thus-separated basic cupric sulfate, whereby an aqueous cupric sulfate solution is formed, (d) adsorbing copper still remaining in the said residual mother liquor by contacting the latter with an adsorbent, and converting the adsorbed copper to aqueous cupric sulfate solution by the action thereon of sulfuric acid, and (e) returning the aqueous cupric sulfate solutions from steps (c) and (d) for precipitating the cupric compounds in step (a).

References Cited in the file of this patent

UNITED STATES PATENTS

| | | |
|---|---|---|
| 672,946 | Langhans | Apr. 30, 1901 |
| 1,716,492 | Hoffmann | June 11, 1929 |
| 1,800,828 | Furness | Apr. 14, 1931 |
| 1,937,524 | Marsh | Dec. 5, 1933 |
| 2,141,763 | Richter | Dec. 27, 1938 |
| 2,184,943 | Pattock et al. | Dec. 26, 1939 |
| 2,370,157 | Furness | Feb. 27, 1945 |
| 2,493,262 | Porwasnik | Jan. 3, 1950 |

FOREIGN PATENTS

| | | |
|---|---|---|
| 517,933 | Great Britain | Feb. 13, 1940 |